Figure 1:
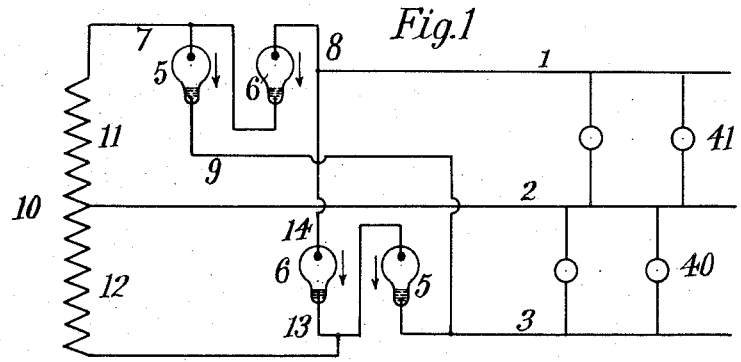

P. H. THOMAS.
THREE-WIRE SYSTEM OF ELECTRICAL DISTRIBUTION.
APPLICATION FILED MAY 6, 1903.

979,396.

Patented Dec. 20, 1910.

Witnesses:

Inventor
Percy H. Thomas
by Charles A. Terry Atty

UNITED STATES PATENT OFFICE.

PERCY H. THOMAS, OF PITTSBURG, PENNSYLVANIA, ASSIGNOR TO COOPER HEWITT ELECTRIC COMPANY, A CORPORATION OF NEW YORK.

THREE-WIRE SYSTEM OF ELECTRICAL DISTRIBUTION.

979,396.      Specification of Letters Patent.      Patented Dec. 20, 1910.

Original application filed January 21, 1903, Serial No. 139,957. Divided and this application filed May 6, 1903. Serial No. 155,922.

*To all whom it may concern:*

Be it known that I, PERCY H. THOMAS, a citizen of the United States, and resident of Pittsburg, county of Allegheny, State of Pennsylvania, have invented certain new and useful Improvements in Three-Wire Systems of Electrical Distribution, of which the following is a specification.

The object of the present invention is to provide a system of circuits and apparatus whereby a three-wire direct current consumption circuit can be supplied from an alternating source.

In carrying out my invention, I control the distribution of the currents derived from the source to the three-wire circuit by means of rectifiers; and I have found that suitable devices for this purpose are the gas or vapor electric apparatus invented by Peter Cooper Hewitt, the general features of such apparatus having been described in certain patents issued to him on the 17th day of September, 1901. Attention is directed to Patents Nos. 682,690 to 682,699 inclusive.

The apparatus referred to consists, in general, of a suitable container within which is a gas or vapor and two or more electrodes. The negative electrode may conveniently be of mercury, and the positive electrode or electrodes may be of iron. It is known that when apparatus of this description is subjected to the proper conditions, current will traverse the gas or vapor within the container in a given direction, after the original resistance to starting has once been broken down, while it will oppose to the flow of current in the opposite direction, a practically prohibitive resistance.

In my United States Patent No. 930,325 of August 3rd, 1909, I have shown and described means for supplying direct current from an alternating source to a plurality of work or consumption circuits admitting of such correlation as to serve, if desired, the purposes of three-wire distribution. In the present invention, the distribution of current from the alternating source is such as to feed a typical three-wire system in which translating devices are arranged on opposite sides of a neutral wire running back to the source and connected to the usual mains.

The drawings, Figures 1, 2, 3 and 4, are diagrams illustrating the connections of a three-wire consumption circuit with various types of alternating current sources.

In the drawings, 1, 2 and 3, represent the wires of a three-wire consumption circuit, 2 being the neutral wire, and 1 and 3 the mains.

Referring more particularly to Fig. 1, 10 represents a source of single-phase alternating current, which may be either a single-phase generator or a transformer delivering single-phase currents. The wire 2 is connected to the source at the middle point between the two parts, 11 and 12, of the winding of the source. The other terminals of these parts or windings are connected to the mains of the three-wire circuit through rectifiers, 5 and 6, as shown. It will be seen that the outer terminal of the winding 11 is connected to the main conductor, 3, through a current rectifier 5, and to the main conductor 1, through a current rectifier 6. The two rectifiers named are shown in reverse positions and the direction of current flow is indicated by arrows. For convenience, the rectifier 5 may be termed a positive device, and the rectifier 6 a negative device. The outer terminal of the winding 12 is connected to the main conductor 3, to a current rectifier 5 and to the main conductor 1 through a current rectifier 6. Stated generally, one of the main conductors is connected to each outer terminal of the source through a positive device, and the other main conductor is connected to each outer terminal through a negative device. Bearing in mind that the current rectifiers permit a flow of current only in the directions indicated by the arrows, it is clear that a positive impulse from the outer terminal of the winding 11 will enter the consumption circuit through the current rectifier 5, and will pass by way of the wire 9 to the main conductor 3, and thence across one side, 40, of the circuit to the wire 2, running to the neutral point of the source. A positive impulse from the outer terminal of the winding 12, will pass to the main conductor, through the positive device 5, and will traverse a similar course back to the neutral point. Negative impulses from the terminals of the source pass to the main conductor 1, traversing the neutral wire 2, and passing through the other side, 41, of the three-wire circuit, and also passing through, in one instance, the wire, 8, the rectifier 6, and the wire 7, and in the other instance the wire 14, rectifier 6, and wire 13. It will be understood that when the two sides of the three-wire circuit are evenly balanced, there will be no resultant current in the neutral wire, and the positive impulses will pass across the entire system, through both sides thereof (40 and 41), and will return either through the wires 8 and 7 and the rectifier 6 between those wires, or through the wires 14 and 13, and the included rectifier 6. Negative impulses will similarly pass through the entire three-wire circuit under the conditions named.

Figure 2:
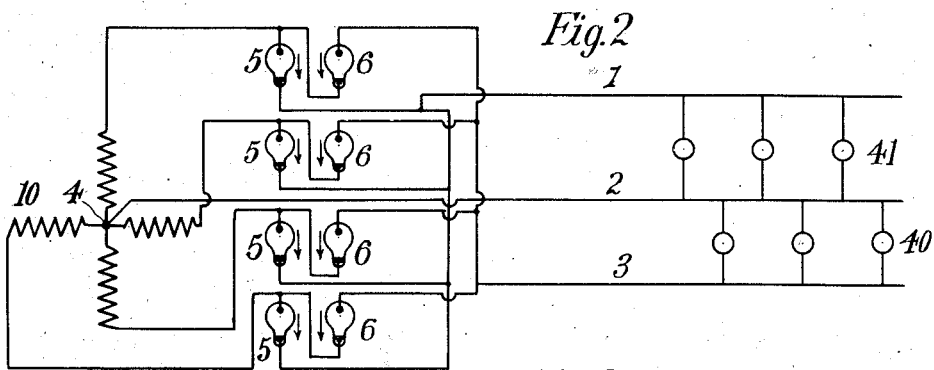

In Fig. 2, 10 may be any source of two-phase or four-phase alternating current having a neutral point, as indicated at 4. A study of the diagram shows that, as before, one of the main conductors of the three-wire circuit supplied by the source 10, is connected to each outer terminal of the source through a positive device, while the other main conductor is connected to each outer terminal through a negative device. This applies also to the systems illustrated in Figs. 3 and 4. The positive impulses from the source are delivered to one side of the three-wire circuit, and the negative impulses to the other side, and the neutral wire acts, as before, to carry current only when the balance of the system is disturbed.

Figure 3:
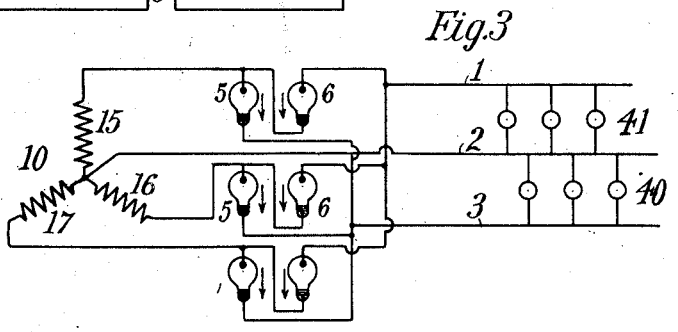
Figure 4:
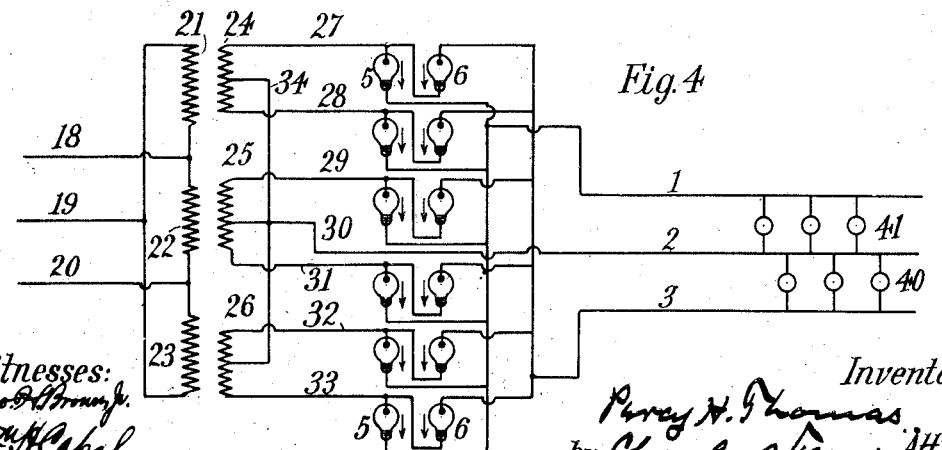

The source illustrated in Fig. 3, at 10, may be either a three-phase generator or a transformer delivering three-phase currents or any other source of three-phase alternating currents. The diagram constituting this figure does not differ, essentially, from those already described, except in the character of the source and the necessary modifications due to such different character. The same is true respecting the diagram Fig. 4. In this instance, the source of alternating currents is diagrammatically illustrated as a group of transformers delivering six-phase currents and receiving its energy from a three-phase source. The wires 18, 19 and 20, are the leads from a source of three-phase currents and they are connected as shown with three transformers, 21, 22 and 23. Coöperating with these transformers, respectively, are the secondaries 24, 25 and 26, which, by virtue of well-known connections illustrated by wires 27, 28, 29, 30, 31, 32, 33 and 34, are capable of delivering six-phase currents. The neutral wire 2, in this instance, is connected to the middle points of the secondaries 24, 25 and 26. The connections from the delivery wires of the six-phase system are similar to those already described and shown in connection with the earlier figures of the drawing.

The rectifying devices 5 and 6, permitting a passage of current in the direction of the arrow only, are operated by any convenient means, as, for example, such means as are shown in connection with devices 28 and 29 of Fig. 1 of applicant's Patent #901,306, issued October 13, 1908, and also in Fig. 1 of his Patent #930,325, issued August 3, 1909.

The illustrated distribution systems are shown in this application merely as typical of systems of distribution of the general character described. It will be understood that the invention is applicable to systems in which the alternating source has any desired number of phases.

This application is a division of my application filed January 21, 1903, Serial Number 139,957.

In a divisional application filed by me October 9th, 1909, Serial Number 521,949, claims are made upon certain features of the invention described herein.

I claim as my invention:

1. The combination with a source of alternating electric currents, of a three-wire direct current consumption circuit, having its neutral wire connected to an intermediate point in the source, and having its main conductors connected to the outer terminals of the source, current rectifiers interposed in the last named connections, the current rectifiers being so adjusted as to permit the flow of current from the terminals to the mains in one direction and to oppose to the flow of current in the opposite direction a prohibitive resistance.

2. The combination with a source of alternating electric currents, of a three-wire direct current consumption circuit, having its neutral wire connected to an intermediate point in the source, and having its main conductors connected to the outer terminals of the source, current rectifiers adapted to permit the passage of current in one direction and to oppose a prohibitive resistance to the passage in the opposite direction, such current rectifiers being connected in pairs and in opposite senses between each terminal and the two main conductors.

Signed at New York, in the county of New York, and State of New York, this 28th day of April A. D. 1903.

PERCY H. THOMAS.

Witnesses:
  Wm. H. Capel,
  George H. Stockbridge.